Figure 11:
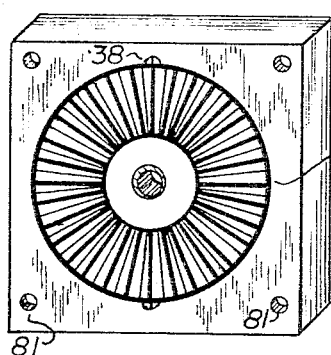

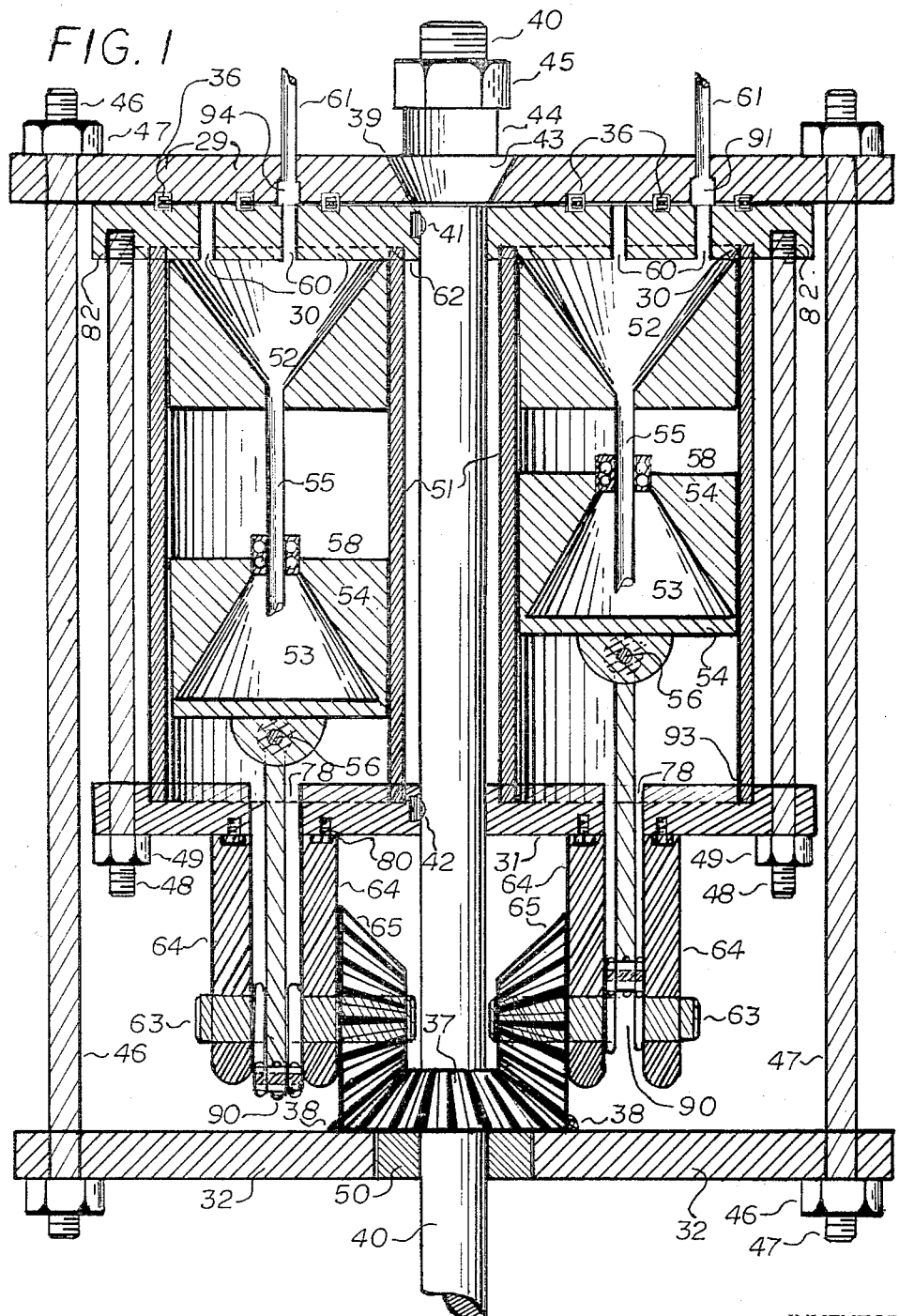

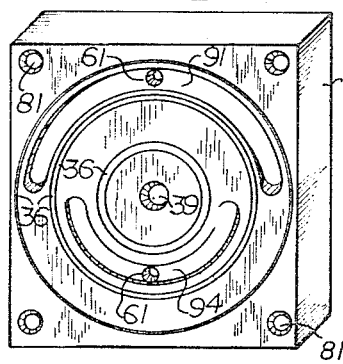
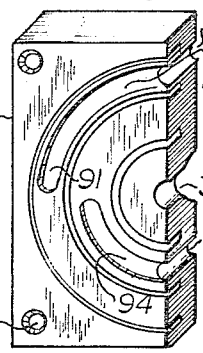
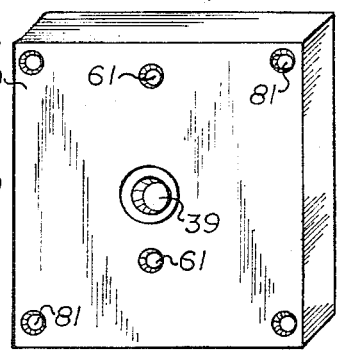
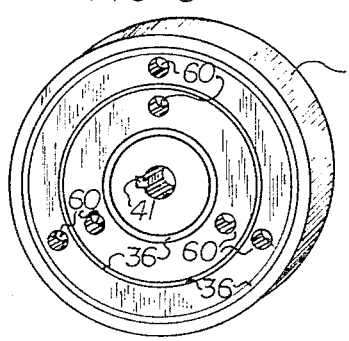
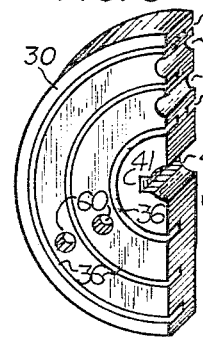
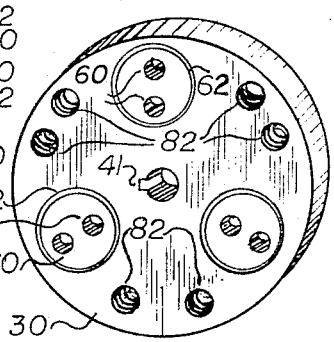
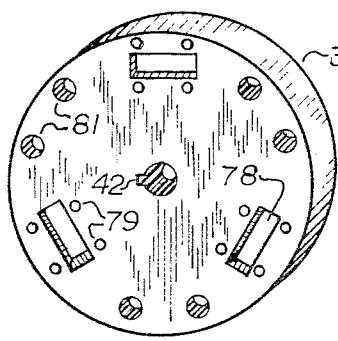
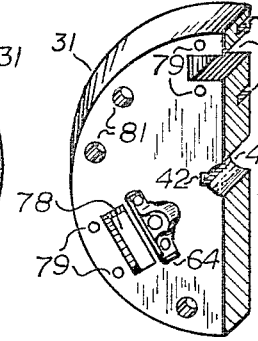
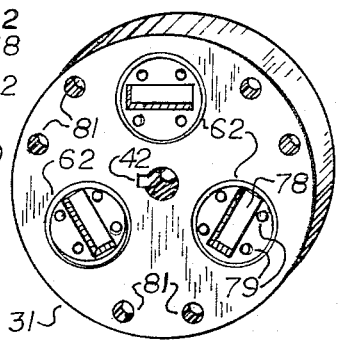

INVENTOR.
Lionel H. Rosenhaft

Feb. 7, 1967  L. H. ROSENHAFT  3,302,528
TWIN COMPRESSION CHAMBER MOTOR
Filed March 16, 1965  5 Sheets-Sheet 4
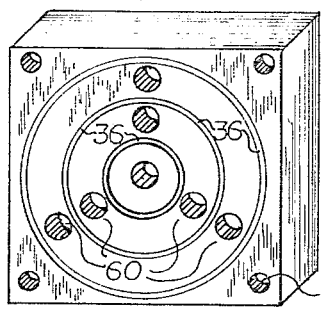
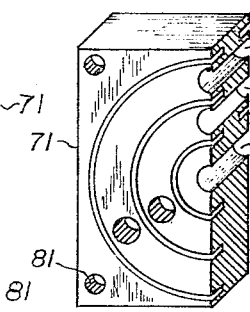
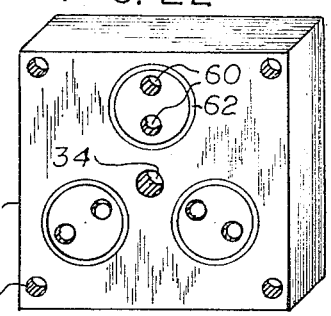
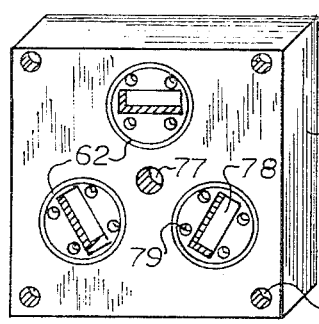
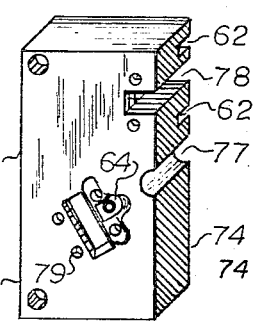
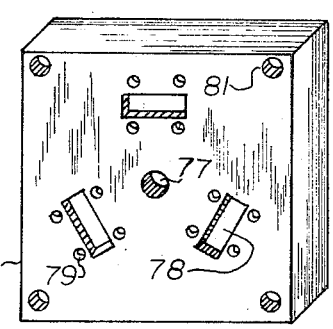
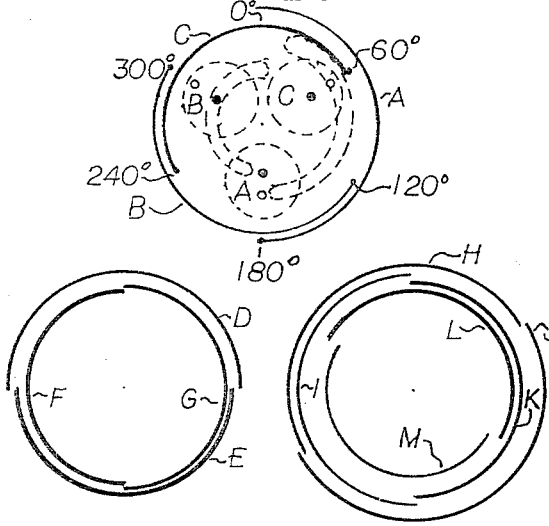
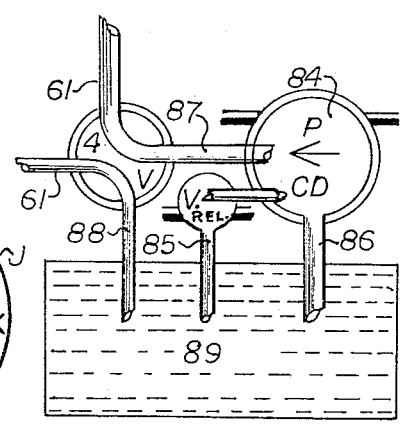
INVENTOR.
Lionel H. Rosenhaft Feb. 7, 1967 L. H. ROSENHAFT 3,302,528
TWIN COMPRESSION CHAMBER MOTOR
Filed March 16, 1965 5 Sheets-Sheet 5

INVENTOR.
Lionel H. Rosenhaft

3,302,528
TWIN COMPRESSION CHAMBER MOTOR
Lionel H. Rosenhaft, Kings County, N.Y.
(1053 E. 55th St., Brooklyn, N.Y. 11234)
Filed Mar. 16, 1965, Ser. No. 440,114
1 Claim. (Cl. 91—180)

This invention relates to an improvement in piston type hydraulic motors, more particularly it relates to a piston type hydraulic motor made with twin compression piston cylinders instead of the conventional type, each piston cylinder having a separate compression chamber built into the upper section; each piston having a built-in compression chamber, said special piston cylinders and said special pistons are parts of Patent #3,156,163, on twin chamber motor assembly units, issued me November 14, 1964. This twin chamber motor idea stems from my original patent application #53,305 filed August 30, 1960 for an orbital motion piston motor, but abandoned by me in 1961 in order to perfect this motor to operate by positive traction. This has now been reduced to practice. This invention is illustrated in two forms; these forms are derived from and are part of the same idea. Both forms using substantially the same parts. One form being that of twin chamber motor assembly units clustered around parallel to and fastened to a motor shaft, all revolving as one unit by the drive gears riding against a stationary circular gear track. The second form being stationary twin chamber motor assembly units formed in a circle around a motor shaft, said motor shaft having a gear fastened thereto, said gear in mesh with piston driven orbital gears on each of the twin chamber motor assembly units, thus forcing the motor shaft to rotate. Both forms require the use of laminated pressure sealing and pressure isolating gaskets in two different forms for these motors to operate efficiently. These are shown in the drawings and described in detail. This laminated pressure sealing and pressure isolating gasket, being a separate invention was filed December 10, 1964, #417,458 and is pending. This motor I call a twin compression chamber motor.

One object of this invention is a motor having a number of piston cylinders formed in a circle around parallel and fastened to a motor shaft forming an armature type motor rotor unit, said motor rotor unit revolving between a front motor stator having an interchange means for hydraulics between a pump means and piston cylinders. A rear motor stator having a motor shaft bearing means and a stationary circular gear track fastened thereto against which the motor rotor unit will orbit. Each one of said piston cylinders housing within itself a separate compression chamber in the upper section, a piston with a separate compression chamber in the lower section, a means for hydraulic interchange between said cylinder compression chamber and said piston compression chamber, also a piston rod connected to said piston. Each piston cylinder housing all above mentioned parts within each cylinder wall is known as a twin chamber motor assembly unit. Each said piston rod connected to an individual crankshaft with a drive gear affixed thereto, a pair of crankshaft bearings for each crankshaft, mounted on a rear motor rotor faceplate, said rear motor rotor faceplate anchored to motor shaft, each and every drive gear in the motor rotor assemly unit is in constant mesh with the stationary fixed circular gear track on rear motor stator, thus the progressive pressures on each piston causes the drive gears to orbit against said fixed circular gear track and revolve the motor rotor unit. This is the motor rotor form.

Another object is to dynamically balance the motor rotor unit for smooth motor shaft torque.

Another object of this invention is to make a shaft driven motor form using substantially the same component parts as in the motor rotor form mentioned above but having the twin chamber motor assembly units mounted in a stationary circle around a revolving motor shaft, said motor shaft having a gear affixed thereto, said motor shaft is rotated by mentioned drive gears in constant mesh with the gear affixed to the motor shaft, thus causing the said drive gears to orbit against the motor shaft gear to rotate said motor shaft. This driven motor shaft form is useful under conditions of use not applicable to the motor rotor unit form.

Another object is a piston type gear orbit motor that can be constructed in even or uneven multiples of two or more by using twin chamber motor assembly units, each unit being a power stroke of 180°.

Another object is power stroke overlap when a twin compression chamber motor is composed of three or more twin chamber motor assembly units. If composed of three twin chamber motor assembly units it will deliver 60° of overlapping power strokes from each piston per motor shaft cycle; when composed of four twin chamber motor assembly units it will deliver 100% of overlapping power strokes from each piston per motor shaft cycle; when composed of six twin chamber motor assembly units it will deliver 200% overlapping power strokes per motor shaft cycle.

Another object is a piston type twin compression chamber motor that will operate equally well in either direction having speed and rotation direction controlled by one four way valve leading to and from a hydraulic motor pump. The neutral position of said four way valve making the motor immobile.

Still another object of this invention is a pump driven motor of the piston type with simplified gaskets for the interchange and pressure sealing of hydraulics under conditions of high friction speed plus high pressures by means of laminated pressure isolating and pressure sealing gaskets.

Figure 12:
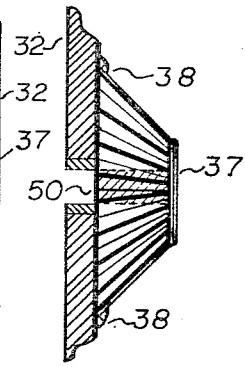
Figure 13:
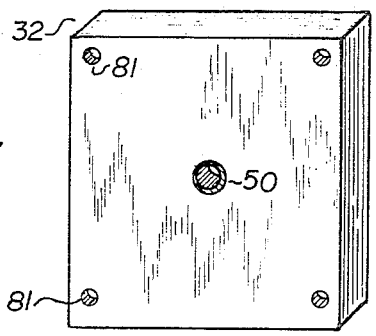
Figure 14:
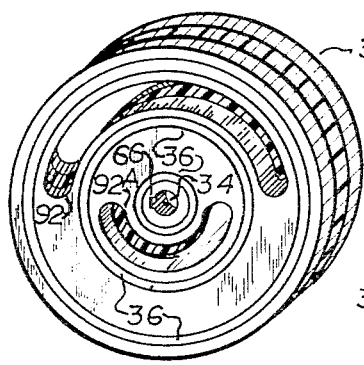
Figure 15:
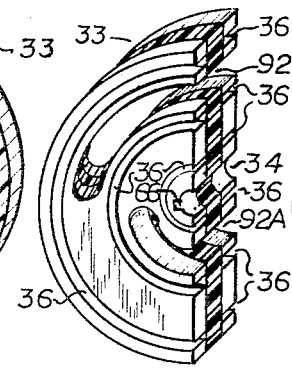
Figure 16:
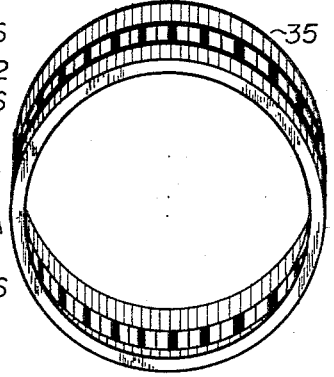
Figure 17:
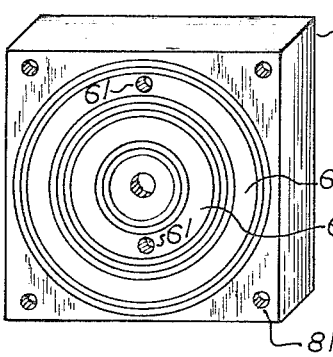
Figure 18:
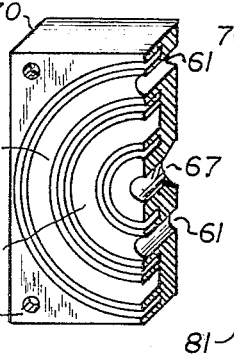
Figure 19:
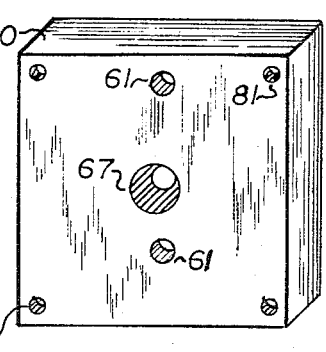
Figure 28:
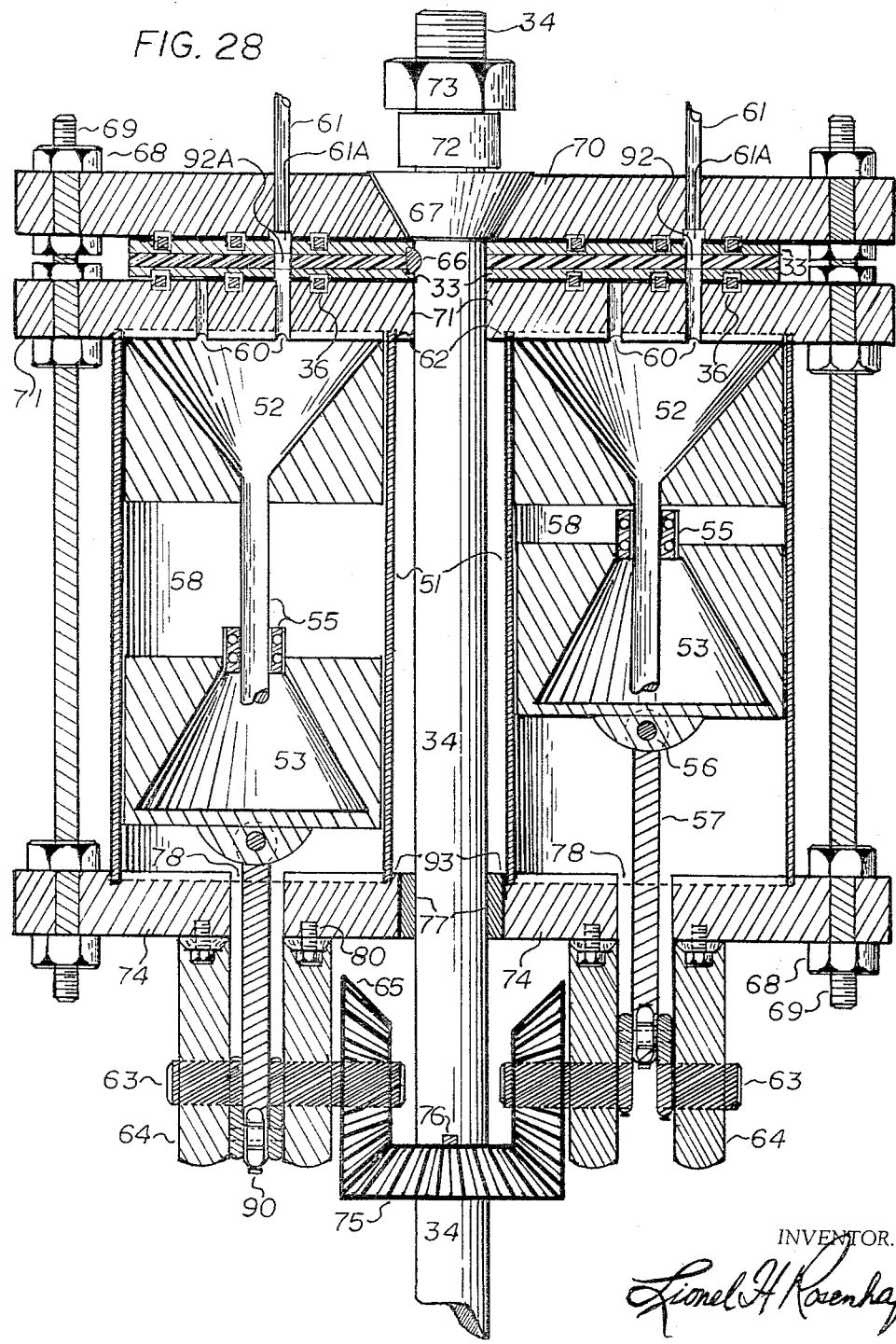

The preamble and objects of this invention show that I use two forms to illustrate this idea; the rotating motor rotor form and the motor shaft driven form, for reasons of simplification numbers 1 through 28 designate figures and numbers 29 through 94 designate parts. Five sheets of drawings show the following: FIG. 1, shows a cut open view of the motor rotor type. In this view is also seen the composition of a twin chamber motor rotor assembly unit as used exclusively in this invention, 51 piston cylinders with the following parts all housed within the same cylinder: 52 a separate built in compression chamber in the upper cylinder section, 54 piston housing a separate compression chamber 53 built within said piston, 55 hydraulic interchange telescopic tubes for communication between 52 and 53, a piston rod anchor means 56 and a piston rod 57. This comprises a twin chamber motor assembly unit, for reasons of brevity these twin chamber motor assembly units will hereafter be referred to as T.C.M.A. units. FIG. 1, shows T.C.M.A. units are formed in a circle around parallel to and fastened to motor shaft 40. This circle of T.C.M.A. units are held securely between 30 front motor rotor faceplate and 31 rear motor rotor faceplate, both 30 and 31 secured to said 40 motor shaft by 41 and 42 keys and fastened together with 48 bolts and 49 nuts. To the outside of said 31 are fastened crankshaft bearings 64 straddling piston rods working area 78, said piston rods projecting beyond area 78 and connected to crankshafts 63. Said 63 having 65 drive gears fastened thereto. This combination of motor shaft 40, front motor rotor faceplate 29, rear motor rotor faceplate 30, T.C.M.A. units, projecting piston rod 57, crankshaft bearings 64, crankshafts 63, with 65 gears fastened thereto all combine to form a motor rotor unit. This motor rotor unit revolves between said front motor rotor stator 29 and said rear motor rotor stator 32, said 32 having suitable bearings 50 for motor shaft 40, a stationary circular gear track 37 welded at 38 to 32. Said 29 and said 32 are secured by bolts 46 and nuts 47, securely holding motor rotor unit between them. Each and every drive gear 65 of said motor rotor unit being in constant mesh with stationary gear track 37 against which the motor rotor unit revolves. Said 29 has thrust bearing 43 recessed at 39, a spacer collar 44, a tension adjustment nut 45 on motor shaft 40, hydraulic interchange passage 61 leading to suitable four way valve and pump means, semicircular hydraulic interchange canals 91 and 94 connecting to said 61 passages, gasket recesses 36 on 29 matching the planes of 36 recesses on 30 front motor rotor faceplate, said recesses 36 housing in common suitable ring type laminated pressure sealing and pressure isolating gaskets 35 as shown in FIG. 16 detail; FIG. 2, shows a face view detail of 29 front motor rotor stator facing toward 30 front motor rotor faceplate. FIG. 3, cut open view of 29 showing details of 91 and 94 semi-circular canals on two planes, each said canal joining a 61 port, said 61 ports for connection to a four way valve and a pump means, said four way valve altering motor rotation by directing hydraulics either to 61 port joining 91 or to 61 port joining 94. FIG. 4, shows view of 29 facing outwardly toward said four way valve and pump means. FIG. 5, shows face view of 30 motor rotor faceplate facing toward 29. FIG. 6, shows cut open view of 30 facing 29 having 60 ports on matching plane with 91 and 94 on 29 in FIG. 3. FIG. 7, face view of 30 facing toward piston cylinders and showing circular recesses 62 encircling two 60 ports on two planes, said circular recesses seating and sealing upper piston cylinder compression chamber. 82 are recessed threaded wells for 48 bolts. FIG. 8, rear motor rotor faceplate 31 facing toward 32 rear motor rotor stator. FIG. 9, same 31 in cut open view. FIG. 10, same 31 facing toward piston cylinders and showing circular recesses 62 encircling one 78 piston rod working area a pair of crankshaft bearings 64 straddling said 78. FIG. 11, shows rear motor rotor stator 32 facing toward 65 crankshaft drive gears with circular gear track 37 welded to 32 at 38. FIG. 12, shows side view of 32 with provided bearing 50 for 40 motor shaft. FIG. 13, shows 32 facing toward power takeoff area. FIG. 14, shows a front view of 33 disc type laminated pressure sealing and pressure isolating gasket (both front and back views are alike) 92 large semicircular aperture pierced through at 0° to 180° on one plane, 92A small semicircular aperture pierced through at 180° to 360° on another plane. FIG. 15, a cut open view of 33 shows detail of 92 and 92A pierced apertures and also shows 36 circular cavities on both sides of 33, each such circular cavity matching in plane the cavity on the opposite side of said 33. FIG. 16, shows perspective view of 35 ring type laminated pressure sealing and pressure isolating gasket used in all provided 36 recessed circles wherever shown. 33 disc type laminated pressure sealing and pressure isolating gasket and 35 ring type laminated pressure sealing and pressure isolating gasket are shown with cores made of plastic and the retaining walls made of metal. These laminations may have a core of elastic or resilient material with the outer walls of nonresilient material. The main object is for the core to resist confinement by keeping constant pressures against the inner walls forcing the outer walls to hold close tolerances in the area it is required to protect against leakage. In 35 the lateral pressures take place by flexing according to pressures exerted on the outer and inner perimeters of the core. This aids to maintain the inner pressures outwardly against the laminated walls of said gasket. FIG. 17, view of front hydraulic interchange stator faceplate 70 shown facing 33. FIG. 18, is cut open view of 70 detail showing 61 ports mating with 61A circular canals for continuous interchange of hydraulics through 92 and 92A semicircular apertures on 33, thence through 60 ports into 52 upper piston cylinder compression chamber. 67 thrust bearing. FIG. 19, view of 70 facing four way control valve and pump means. FIG. 20, view of 71 facing 33, showing two circles of 60 hydraulic interchange ports on two planes, two such ports, to a piston cylinder of a T.C.M.A. unit, in between said two planes of said ports and on both sides of said planes of ports are 36 recessed circles of cavities on planes to match similar 36 recessed circles of cavities on 33, said 36 cavities housing in common 35 ring type laminated pressure sealing and pressure isolating gaskets. FIG. 21, cut open view of 71. FIG. 22, view of 71 facing piston cylinders, showing circular recesses 62 encircling two 60 on separate planes, said 62 seating and sealing upper piston cylinder compression chamber. 71 having a clearance aperture for 34 motor shaft. FIG. 23, view of 74 rear motor stator faceplate showing 78 apertures for piston working area, one such aperture for each piston cylinder, each one circular recess 93 encircles one 78 aperture. FIG. 24, shows cut open detail of 74. FIG. 25, view of 74 facing motor shaft gear. 75 anchored to said motor shaft 34 by key 76, said motor shaft riding in provided bearing 77. FIG. 26, A, B, C, shows graph of 60° power stroke overlap of a three T.C.M.A. unit motor composition. FIG. 26, D, E, F, G, shows graph of 100% power stroke overlap of a four T.C.M.A. unit motor composition. FIG. 26, H, I, J, K, L, M, shows graph of 200% power stroke overlap of a six T.C.M.A. unit motor composition. With a motor composed of three or more T.C.M.A. units there is a power stroke overlap and the ability of instant rotation reversal. FIG. 27, shows detail of a pump means circuit. This is only for illustration purposes, any desired pump means may be used. The drawings FIGS. 1 and 28, both show a two T.C.M.A. unit motor composition for ease of viewing. FIG. 28, shows a cut open view of the shaft driven type motor. In this type the T.C.M.A. units are formed in a stationary circle around motor shaft 34, said motor shaft having gear 75 affixed thereto, said motor shaft is rotated by drive gears 65 in constant mesh with said 75 motor shaft gear.

Parts listed in numerical sequence 29 through 94: 29 front motor rotor stator; 30 front motor rotor faceplate; 31 rear motor rotor faceplate; 32 rear motor rotor stator; 33 disc type laminated pressure sealing and pressure isolating gasket; 34 motor shaft with gear 75; 35 ring type laminated pressure sealing and pressure isolating gasket; 36 recesses for half housing 35 gaskets; 37 stationary circular gear track; 38 weld of 37 to 32; 39 bearings for motor shaft; 41 and 42 keyways on 40 shaft; 43 thrust bearing recessed into 29; 44 thrust bearing spaced; 45 nut on 40 shaft; 46 bolts; 47 nuts for anchoring 29 to 32; 48 bolts; 49 nuts for anchoring 30 to 31; 50 motor shaft bearing for 40; 51 T.C.M.A. unit piston cylinder; 52 upper cylinder compression chamber; 53 piston compression chamber; 54 piston; 55 hydraulic interchange telescopic tubes connecting 52 and 53; 56 piston rod anchor; 57 piston rod; 58 space area between compression chambers 52 and 53; 60 hydraulic interchange apertures on upper piston cylinder compression chamber; 61 hydraulic interchange apertures connecting to pump means; 62 recessed grooves for sealing upper piston cylinder compression chamber; 63 individual crankshafts; 64 crankshaft bearings; 65 crankshaft drive gears fastened to 63 individual crankshafts; 66 keyways on motor shaft 34 for 33; 67 thrust bearings recessed into 70; 68 double ended bolts, and 69 nuts for anchoring 70 and 71 to 74; 70 front hydraulic interchange stator faceplate; 71 front motor stator faceplate; 72 thrust bearing spacer; 73 nut on motor shaft; 74 rear motor stator faceplate; 75 gear anchored to 34 shaft; 76 keyway for 75; 77 bearing on 74 for 34 shaft; 78 piston rod working area; 79 mounting holes for crankshaft bearings 64; 80 anchor bolts for 64; 81 mounting holes for 48 bolts; 82 recessed mounting holes in detail FIG. 7; 83 four way valve leading to 61 ports as shown in FIG. 27; 84 hydraulic pump; 85 relief valve; 86 hydraulic intake; 87 hydraulic pressure line; 88 return line to hydraulic reservoir 89; 90 piston rods connected to crankshafts; 91 large semicircular canals for hydraulic interchange on 29 connected to 61; 92 large semicircular apertures pierced through 33 disc type gaskets for hydraulic interchange; 92A small semicircular apertures pierced through 33 disc type gaskets for hydraulic interchange; 93 recessed grooves for holding lower section of 51 T.C.M.A. piston cylinders; 94 small semicircular canals for hydraulic interchange on 29 connected to 61.

*Twin compression chamber motor operation*

For demonstration I will use a three T.C.M.A. motor composition, graph A, B, C, FIG. 26. Graph shows broken lines for phantom location of piston cylinders in relation to semicircular hydraulic interchange canals and piston cylinder hydraulic interchange ports. A pump means is feeding hydraulic pressures to a four-way valve which controls pressure direction, said four way valve connected to both 61 ports. For counterclockwise rotation set four way valve to feed 61 into 94 and to exhaust 61 from 91. Graph shows C registering feeding port 61 with 91 semicircular hydraulic interchange port, therefore the rotation is clockwise. 83 feeds into 61, thence into 91, thence into 60 into 52 top cylinder compression chamber. Simultaneously B cylinder is exhausting into 60, thence through 94, thence through 61. A has just completed its power stroke and is at 180° on a dead spot between 91 and 94. The piston rod is now extended to its maximum, the slightest next movement brings A, one cylinder port 60 into register with 94 and then will start the exhaust stroke while the other cylinder port 60 rides a blind spot from 180° to 360°. B cylinder is at 300° on its exhaust stroke, C cylinder is at 60° on its power stroke, one cylinder port 60 in register with 91 and the other port 60 is riding blind and will do so for another 120°. The piston cylinders are spaced 120° apart. As A has traveled from 120° to 180°, B has traveled 240° to 300°, C has traveled from 0° to 60°. As A moves into exhaust position registration, B will continue to exhaust for another 60° before one 60 port loses register with 94 and starts to travel blind for the next 180° while the other 60 port is in register with 91 from 0° to 360°. As A cylinder reaches 360° and moves, another motor shaft cycle will commence as A cylinder will have maximum contraction of its piston rod and upon movement will begin to extend said piston rod with the intake stroke. The power stroke sequence is C, then B, then A, etc. for as long as hydraulics under pressure are delivered through 91 and exhausted through 94, the piston rods will continue to extend and contract in varying degrees simultaneously in orderly sequence, said action rotating each individual crankshaft with drive gear attached. In a motor rotor form all said drive gears are in constant mesh with stationary circular gear track on rear motor rotor stator, thus causing the said drive gears orbiting said circular gear track to revolve the entire motor rotor unit. In a motor shaft driven form, said T.C.M.A. units being stationary the said crankshaft drive gears in constant mesh with a gear fixed to said motor shaft causes the motor shaft to revolve as the said drive gears orbit. When the four way valve is put into neutral position hydraulics cannot flow in either direction, the motor is frozen into immobility.

The similarity of most parts in both versions of this motor, the unique assembly of parts and the overlapping of power action obtainable are all shown in the drawings and graphs so that anyone skilled in the arts may make the same. This motor is applicable to air, steam or hydraulics. For illustration purposes only hydraulics has been chosen. Having thus disclosed my invention of this twin compression chamber motor I claim all rights within the limit and scope of this invention and hope and pray that Letters Patent be granted to me.

I claim:

A piston type gear orbiting motor in combination having twin compression chamber piston cylinders formed in a circle around and parallel to a motor shaft, each one of said piston cylinders housing a separate compression chamber in the upper piston cylinder section, a piston with a separate built-in compression chamber in the lower piston cylinder section, suitable telescopic tubes properly sealed against leakage, said telescopic tubes being a movable linkage for hydraulic interchange between said separate upper piston cylinder compression chamber and said separate compression chamber built into said piston, a means of anchoring a piston rod to the lower section of said piston, a piston rod anchored to said piston; all of said piston cylinders forming said circle around said motor shaft are securely anchored between a front motor faceplate and a rear motor faceplate, said front motor faceplate having a series of hydraulic interchange ports pierced through said front motor faceplate, said hydraulic interchange ports in communication with said upper piston cylinder compression chamber, two such said ports provided for each said piston cylinder, said ports forming two circles in-between and on both sides of said circle of said ports are recessed circular cavities, each said recessed circular cavity providing housing for inserting suitable ring type laminated pressure sealing and pressure isolating gaskets to separate the different operating hydraulic pressures between above said circle of hydraulic interchange ports; said rear motor faceplate having one oblong aperture for each said piston rod for piston rod working area, each said piston rod projecting beyond said rear motor faceplate through said oblong apertures and each said piston rod connected to an individual crankshaft with a pair of individual crankshaft bearings, each said pair of crankshaft bearings fastened to rear of said rear motor faceplate one each said pair of crankshaft bearings straddling one said oblong aperture, each said individual crankshaft having an individual drive gear anchored thereto; provide a suitable fluid source with a four way valve directing hydraulic flow through a suitable hydraulic interchange faceplate to said hydraulic interchange ports on said front motor faceplate.

References Cited by the Examiner

UNITED STATES PATENTS

| | | | |
|---|---|---|---|
| 672,263 | 4/1901 | Dean | 91—180 |
| 1,483,198 | 2/1924 | Schinkez | 91—198 |
| 1,742,088 | 12/1929 | Maxson | 91—180 |
| 1,804,921 | 12/1931 | Ellyson | 91—180 |

FOREIGN PATENTS 75,381   7/1929   Sweden.

MARTIN P. SCHWADRON, *Primary Examiner.*

SAMUEL LEVINE, PAUL E. MASLOUSKY, EDGAR W. GEOGHEGAN, *Assistant Examiners.*